(12) United States Patent
Moss

(10) Patent No.: US 11,752,673 B2
(45) Date of Patent: Sep. 12, 2023

(54) INJECTION MOLDING APPARATUS AND METHOD FOR AUTOMATIC CYCLE TO CYCLE CAVITY INJECTION

(71) Applicant: Synventive Molding Solutions, Inc., Peabody, MA (US)

(72) Inventor: Mark Moss, Sarasota, FL (US)

(73) Assignee: Synventive Molding Solutions, Inc., Peabody, MA (US)

( * ) Notice: Subject to any disclaimer, the term of this patent is extended or adjusted under 35 U.S.C. 154(b) by 428 days.

(21) Appl. No.: 17/108,018

(22) Filed: Dec. 1, 2020

(65) Prior Publication Data

US 2021/0078221 A1    Mar. 18, 2021

Related U.S. Application Data

(63) Continuation of application No. 15/724,550, filed on Oct. 4, 2017, now Pat. No. 10,875,221, which is a
(Continued)

(51) Int. Cl.
*B29C 45/13* (2006.01)
*B29C 45/76* (2006.01)
(Continued)

(52) U.S. Cl.
CPC .......... *B29C 45/13* (2013.01); *B29C 45/2703* (2013.01); *B29C 45/2725* (2013.01);
(Continued)

(58) Field of Classification Search
CPC ......... B29C 45/13; B29C 45/22; B29C 45/23; B29C 45/2806; B29C 45/2865
See application file for complete search history.

(56) References Cited

U.S. PATENT DOCUMENTS

| 6,632,079 B1 | 10/2003 | Kazmer et al. |
| 2014/0210119 A1 | 7/2014 | Galati et al. |

(Continued)

FOREIGN PATENT DOCUMENTS

| JP | 4325219 | 11/1992 |
| WO | 2014134376 A1 | 9/2014 |

OTHER PUBLICATIONS

Annex to Form PCT/ISA/206, Communication Relating to the Results of the Partial International Search and Written Opinion dated Oct. 25, 2017 in corresponding Int'l. Appln. No. PCT/US2017/043029.
(Continued)

*Primary Examiner* — Alison L Hindenlang
*Assistant Examiner* — Alexander A Wang
(74) *Attorney, Agent, or Firm* — Polsinelli, P.C.

(57) ABSTRACT

An injection molding system comprising:
a first selected valve,
one or more downstream valves, delivering a fluid to a mold cavity,
at least one fluid property sensor that detects a flow front of fluid material flowing downstream through the mold cavity at a trigger location within the cavity disposed between the first gate and at least one selected downstream gate,
a controller instructing an actuator associated with the downstream gates to open the gates at a predetermined open gate target time on a first injection cycle,
each valve associated with a position sensor that detects opening of a gate at an actual open gate time to the controller,
the controller automatically adjusting time of instruction to open the gates on a subsequent injection cycle by an
(Continued)

adjustment time equal to any delay in time between the predetermined open gate target time and the actual open gate time.

23 Claims, 8 Drawing Sheets

Related U.S. Application Data continuation of application No. PCT/US2017/043029, filed on Jul. 20, 2017.

(60) Provisional application No. 62/364,488, filed on Jul. 20, 2016.

(51) Int. Cl.
*B29C 45/28* (2006.01)
*B29C 45/27* (2006.01)
*G05D 7/01* (2006.01)
*B29C 45/77* (2006.01)
*G05D 7/06* (2006.01)
*B29C 45/00* (2006.01)

(52) U.S. Cl.
CPC .......... *B29C 45/281* (2013.01); *B29C 45/762* (2013.01); *B29C 45/77* (2013.01); *G05D 7/0113* (2013.01); *G05D 7/0635* (2013.01); *B29C 2045/0032* (2013.01); *B29C 2045/279* (2013.01); *B29C 2045/2865* (2013.01); *B29C 2945/7607* (2013.01); *B29C 2945/76043* (2013.01); *B29C 2945/76056* (2013.01); *B29C 2945/76086* (2013.01); *B29C 2945/76093* (2013.01); *B29C 2945/76167* (2013.01); *B29C 2945/76187* (2013.01); *B29C 2945/76287* (2013.01); *B29C 2945/76381* (2013.01); *B29C 2945/76454* (2013.01); *B29C 2945/76488* (2013.01); *B29C 2945/76555* (2013.01); *B29C 2945/76558* (2013.01); *B29C 2945/76648* (2013.01); *B29C 2945/76859* (2013.01); *B29C 2945/76876* (2013.01); *B29C 2945/76936* (2013.01)

(56) References Cited

U.S. PATENT DOCUMENTS

2014/0300019 A1  10/2014  Moss
2016/0061960 A1   3/2016  Rosnan

OTHER PUBLICATIONS

Carl Hanser Verlag et al. "Injection Molding Hot runner Technology Intelligently Controlled Cascade Injection Molding—The Italian Hot Runner Specialist HRSflow Focuses on the Quality of Large-Format Parts Uniform Melt Flow Results in High-Quality Surfaces" Feb. 15, 2016, XP055334773, www.kunststoffe-international.com/archive.
Int'l. Search Report and Written Opinion dated Oct. 26, 2017 in corresponding application PCT/US2017/043100.
Feb. 16, 2018 ISR and Written Opinion in PCT/US2017/043029.
JP H05 96593 A, Japan Steel Works, Apr. 20, 1993 with English language abstract.
International Preliminary Report on Patentability in PCT/US2017/043100 dated Jan. 31, 2019.
International Preliminary Report on Patentability in PCT/US2017/043029 dated Jan. 31, 2019.
Extended European Search Report in EP Application No. 19182162.8, dated Sep. 11, 2019.
Extended European Search Report in EP Application No. 19180864.1, dated Sep. 13, 2019.
Extended European Search Report in EP Application No. 19180862.5, dated Sep. 13, 2019.
Extended European Search Report in EP Application No. 19182165.1, dated Oct. 25, 2019.
Mar. 22, 2018 Republication of WO 2018/017807A3 with International Search Report and observations that cover both Claim groups 1-36 and 37-41 in corresponding PCT Application No. PCT/US2017/043029.

INJECTION MOLDING APPARATUS AND METHOD FOR AUTOMATIC CYCLE TO CYCLE CAVITY INJECTION

RELATED APPLICATIONS

This application is a continuation of and claims the benefit of priority to U.S. application Ser. No. 15/724,550 filed on Oct. 4, 2017, which in turn is a continuation of and claims the benefit of priority to PCT/US17/043029 filed Jul. 20, 2017 which in turn claims the benefit of priority to U.S. Application Ser. No. 62/364,488, filed 20 Jul. 2016 the disclosures of which are incorporated by reference as if fully set forth in their entirety herein.

The disclosures of all of the following are incorporated by reference in their entirety as if fully set forth herein: U.S. Pat. Nos. 5,894,025, 6,062,840, 6,294,122, 6,309,208, 6,287,107, 6,343,921, 6,343,922, 6,254,377, 6,261,075, 6,361,300 (7006), U.S. Pat. Nos. 6,419,870, 6,464,909 (7031), U.S. Pat. Nos. 6,599,116, 7,234,929 (7075US1), U.S. Pat. No. 7,419,625 (7075US2), U.S. Pat. No. 7,569,169 (7075US3), U.S. patent application Ser. No. 10/214,118, filed Aug. 8, 2002 (7006), U.S. Pat. No. 7,029,268 (7077US1), U.S. Pat. No. 7,270,537 (7077US2), U.S. Pat. No. 7,597,828 (7077US3), U.S. patent application Ser. No. 09/699,856 filed Oct. 30, 2000 (7056), U.S. patent application Ser. No. 10/269,927 filed Oct. 11, 2002 (7031), U.S. application Ser. No. 09/503,832 filed Feb. 15, 2000 (7053), U.S. application Ser. No. 09/656,846 filed Sep. 7, 2000 (7060), U.S. application Ser. No. 10/006,504 filed Dec. 3, 2001, (7068) and U.S. application Ser. No. 10/101,278 filed Mar. 19, 2002 (7070) and PCT application no. PCT/US2011/029721 filed Mar. 24, 2011 (7094), PCT publication no. WO2012074879 (A1) (7100WO0) and WO2012087491 (A1) (7100W01) and PCT/US2013/75064 (7129WO0) and PCT/US2014/19210 (7129WO1) and PCT/US2014/31000 (7129WO2).

FIELD OF THE INVENTION

The present invention relates to injection molding systems and methods, and more particularly to a system and method for triggering and timing the opening of valve pins in a sequential valve gate process.

BACKGROUND OF THE INVENTION

Injection molding systems that feature sequential opening of multiple gates to a single mold cavity provide significant advantages to the molding of large scale parts, such as automobile body parts. The benefits of sequential valve gating depend upon the sequential timing between the upstream and downstream gates, so that the melt flows from each gate coalesce into a single smooth flow stream in the cavity. Otherwise, air bubbles or surface defects in the molded part will occur.

SUMMARY OF THE INVENTION

In various embodiments, the invention relates to an apparatus and method for triggering the opening of multiple gates to a single mold cavity of an injection molding system. In contrast to the prior art valve gating systems that depend on a preset time or screw position, in one embodiment the present invention utilizes a new apparatus and method of triggering based on flow front detection in the cavity coupled with detection by position sensors of the actual time of valve pin withdrawal from the respective gate. In another embodiment the invention utilizes triggering based on a start of injection cycle or a position of a screw barrel that feeds fluid material to an injection molding system, coupled with detection by position sensors of the actual time of valve pin withdrawal from the respective gate. These embodiments enable automatic adjustments to be made on subsequent injection cycles. The invention thus facilitates automatic set-up, monitoring and/or adjustment of the sequential valve gating process and reduces the need for highly experienced operators.

In accordance with the invention there is provided an injection molding system (10) for initiating flow of fluid material (4) into multiple gates of a mold cavity (18) during an injection molding cycle, the system (10) comprising:

a first selected valve comprising a first fluid flow passage (22C) having a first gate (24C) to the cavity, a first valve pin (26C) driven reciprocally along an axial upstream downstream path of travel through the first flow passage (22C) by a first actuator (30C) between gate open and gate closed positions, one or more downstream valves, each downstream valve comprising a downstream fluid flow passage (22A, 22B, 22D, 22E) having a downstream gate (24A, 24B, 24D, 24E) to the cavity (18) disposed downstream of the first gate (24C), a downstream valve pin (26A, 26B, 26D, 26E) driven reciprocally along an axial upstream downstream path of travel through the downstream fluid flow passage (22A, 22B, 22D, 22E) by a downstream actuator (30A, 30B, 30D, 30E) between a gate open and a gate closed position, at least one fluid property sensor (50A, 50B, 50D, 50E) mounted within the system such that the fluid property sensor detects, at a downstream detection time, a selected property of a fluid flow front (5R, 5L) of the fluid material (4) flowing downstream through the mold cavity at a trigger location within the cavity disposed between the first gate (24C) and at least one selected downstream gate (24A, 24B, 24D, 24E), the fluid property sensor (50A, 50B, 50D, 50E) sending a first signal indicative of the downstream detection time to a controller (60), the controller (60) receiving the first signal and including a set of instructions that instruct the actuator (30A, 30B, 30D, 30E) of the valve associated with the at least one selected downstream gate (24A, 24B, 24D, 24E) to open the gate on a first injection cycle by withdrawing the valve pin (26A, 26B, 26D, 26E) from the gate closed position at an instruction time (X), the instruction time on the first injection cycle comprising a predetermined open gate target time (X) following the downstream detection time, wherein the valve associated with the at least one selected downstream gate further includes a position sensor that detects an actual open gate time (A) upon withdrawal of the valve pin from the at least one selected downstream gate (24A, 24B, 24D, 24E), the position sensor sending a signal indicative of the actual open gate time (A) to the controller, the controller receiving the signal from the first position sensor and including a set of instructions that automatically determines an adjusted instruction time (X') for use on a subsequent injection cycle, wherein the instructions that automatically determines comprises decreasing the time of instruction to the valve pin to open on the subsequent injection cycle by an adjustment time equal to any delay in time (Y) between the predetermined open gate target time (X) and the actual open gate time (A).

In such a system, the instructions can be performed continuously over a plurality of subsequent injection molding cycles, and wherein the adjusted instruction time (X') of a subsequent cycle is determined by increasing or decreasing the adjusted instruction time of a prior cycle by an adjustment time equal to the difference in time between the actual open gate time of the prior cycle and the actual open gate time of a present subsequent cycle.

Such system can further comprise one or more additional fluid property sensors (50A, 50B, 50D, 50E) associated with each downstream gate mounted within the system such that each additional fluid property sensor detects, at a downstream detection time, the selected property of the flow front of the fluid material flowing downstream at an additional trigger location within the cavity disposed between the first gate and each downstream gate, each additional fluid property sensor sending a corresponding first signal indicative of the respective downstream detection time to the controller, the controller receiving the corresponding first signals and including a set of instructions that instruct the actuator of the valve associated with each downstream gate to open the gate by withdrawing a corresponding valve pin from the gate closed position at a respective predetermined open gate target time (X) following the respective downstream detection time.

Each of the one or more downstream valves typically includes an associated position sensor that detects an actual open gate time (A) upon withdrawal of the valve pin from the associated downstream gate, each associated position sensor sending a signal indicative of the sensed position of each corresponding valve pin to the controller, the controller receiving the signals from each of the associated position sensors, the controller including a set of instructions that automatically determines an adjusted instruction time (X') for use on a subsequent injection cycle, wherein the instructions that automatically determines comprises decreasing the time of instruction to the respective valve pin to open on a subsequent injection cycle by an adjustment time equal to any delay in time (Y) between the predetermined open gate target time (X) and the actual open gate time (A).

The fluid property sensor is a temperature sensor and the sensed property is temperature or change in temperature.

In another aspect of the invention there is provided a method of operating an injection molding system (10) for initiating flow of a fluid material into multiple gates of a mold cavity (18) during an injection cycle, wherein the system includes:

a first selected valve comprising a first fluid flow passage (22C) having a first gate (24C) to the cavity, a first valve pin (26C) driven reciprocally along an axial upstream downstream path of travel through the first flow passage (22C) by a first actuator (30C) between gate open and gate closed positions, one or more downstream valves, each downstream valve comprising a downstream fluid flow passage (22A, 22B, 22D, 22E) having a downstream gate (24A, 24B, 24D, 24E) to the cavity (18) disposed downstream of the first gate (24C), a downstream valve pin (26A, 26B, 26D, 26E) driven reciprocally along an axial upstream downstream path of travel through the downstream fluid flow passage (22A, 22B, 22D, 22E) by a downstream actuator (30A, 30B, 30D, 30E) between a gate open and a gate closed position the method comprising:

detecting, at a downstream detection time, a select property of a flow front of the fluid material flowing downstream at a trigger position within the cavity disposed between the first gate (24C) and at least one selected downstream gate (24A, 24B, 24D, 24E) wherein, instructing the actuator (30A, 30B, 30D, 30E) of the valve associated with the at least one selected downstream gate (24A, 24B, 24D, 24E), or a control valve for that actuator, to withdraw the valve pin (26A, 26B, 26D, 26E) from the gate closed position at an instruction time (X) comprising a predetermined open gate target time (X) following the downstream detection time, detecting, at an actual open gate time (A), withdrawal of the valve pin (26A, 26B, 26D, 26E) from the at least one selected downstream gate, determining an adjusted instruction time (X'), for use on a subsequent injection cycle, wherein the determining step comprises decreasing the time of instruction to the valve pin to open on a subsequent injection cycle by an adjustment time equal to any delay in time (Y) between the predetermined open gate target time (X) and the actual open gate time (A).

Such a method can further comprise operating the system described above to cause the actuator of the valve associated with the at least one selected downstream gate to withdraw the valve pin from the gate closed position at the adjusted instruction time (X') following the downstream detection time.

In such a method, the determining step is preferably performed continuously over a plurality of subsequent injection molding cycles, and wherein the subsequent adjusted instruction time (X') is determined by increasing or decreasing the adjusted instruction time of a prior cycle by an adjustment time equal to the difference in time between the actual open gate time of the prior cycle and the actual open gate time of the present cycle.

In another aspect of the invention there is provided a method of initiating flow of fluid material (4) into a gate (24) of a mold cavity (18) during an injection molding cycle, the cavity having multiple gates including an upstream gate (24u) and a downstream gate (24d), each gate having an associated actuator (30) and valve pin (26), and the valve pin being driven by the actuator between a gate closed position (GCP) and a gate open position (GOP), a position sensor (40) associated with the downstream gate that detects withdrawal of the valve pin from the gate closed position toward the gate open position at an actual open gate time (A) and generates an opening signal ($S_O$) indicative of the actual open gate time (A), a cavity sensor (50) that detects a selected physical condition of arrival (DA) of a flow front (5) of the fluid material at a cavity sensor location (CSL) disposed within the mold cavity between the upstream and downstream gates and generates a detection arrival signal ($S_{DA}$) indicative of a time ($t_{DA}$) of the detected arrival of the flow front;

a controller (60), communicating with the cavity sensor (50), position sensor (40) and actuator (30), the method comprising steps of:

during a first injection molding cycle:

detecting, by the cavity sensor (50), the arrival of the flow front of the fluid material in the cavity at the cavity sensor location (CSL) and transmitting the detection signal ($S_{DA}$) to the controller (60), the controller (60) generating and transmitting to the downstream actuator (30d), or a control valve that controls the downstream actuator, a gate open signal ($S_{GO}$) at an instruction time comprising a predetermined open gate target time (X) subsequent to the detected arrival time ($t_{DA}$), sensing, by the position sensor (40d) of the downstream gate, withdrawal of the valve pin and transmitting the opening signal (S$_O$) to the controller (60) with the actual open gate time (A), the actual open gate time (A) being indicative of a delay time (Y) between the predetermined open gate target time (X) and the actual open gate time (A), the controller (60) generating an adjusted instruction time (X') comprising the predetermined open gate target time (X) minus the delay time (Y), and during a subsequent injection molding cycle, after the cavity sensor (50) detects and transmits the detection signal (S$_{DA}$) to the controller (60), the controller transmitting to the downstream actuator (30d) or its control valve a gate open signal (S$_{GO}$) at the adjusted instruction time (X') subsequent to the detected arrival time (t$_{DA}$).

10. The method of claim 9 comprising:

providing, for a plurality of adjacent upstream and downstream gate pairs (24u, 24d), the associated position and cavity sensors (40, 50) and performing the method steps during the first and subsequent injection molding cycles, and wherein the subsequent adjusted instruction time (X') is determined by increasing or decreasing the adjusted instruction time of a prior cycle by an adjustment time equal to the difference in time between the actual open gate time of the prior cycle and the actual open gate time of the present cycle.

The upstream gate can be a first upstream gate (24u1) that initiates an initial flow front (5i) into the cavity (18).

The actuator (30u1) associated with the first upstream gate (24u1) typically receives a start of cycle signal (S$_{SC}$) from the controller (60) or an injection molding machine (12) and in response thereto the actuator (30u1) initiates opening movement of the valve pin for the first upstream gate (24u1).

The cavity sensor (50) is typically a temperature sensor.

The position sensor (40) is typically a hall effect sensor.

The position sensor (40) can sense movement of an actuator piston (32) that drives the valve pin (26).

The actuator (30) typically includes a solenoid valve (36) that is activated by the gate open signal (S$_{GO}$) to drive the valve pin (28) from the gate closed position (GCP) toward the gate open position (GOP).

The actuator (30) can be an electronic actuator and the position sensor (40) can be an encoder.

The method steps can be performed continuously over a plurality of subsequent injection molding cycles, and wherein the subsequent adjusted instruction time (X') is determined by increasing or decreasing the adjusted instruction time of a prior cycle by an adjustment time equal to the difference in time between the actual open gate time of the prior cycle and the actual open gate time of the present cycle.

19. A method according to any the foregoing claims 9-18 wherein the cavity sensor (50) continuously detects a selected physical condition at the cavity sensor location (CSL) and transmits a continuous output signal to the controller (60) indicative of the detected physical condition.

The position sensor (40) can continuously detect a position of the valve pin (26) and transmits a continuous output signal to the controller (60) indicative of the detected position.

The position sensor (40) can comprise a switch that only detects the initial opening of the valve pin and transmits the opening signal to the controller (60).

21. A method according to any the foregoing claims 9-20 wherein the cavity (18) includes a plurality of upstream and downstream gate pairs (24u1, 24d1; 24u2, 24d2; . . . ) having the associated cavity and position sensors (40-1, 50-1; 40-2, 50-2; . . . ), and the method steps are performed for each associated gate pair.

The method steps can be performed until all valve pins (26) are in the open position and the cavity (18) is filled with the fluid material (4).

The subsequent injection molding cycle can be the immediately following injection molding cycle.

Such a method can further comprise performing a trial injection molding cycle to determine the predetermined open gate target time (X).

The controller (60) can receive the predetermined open gate target time (X) from a computer input device (80) that receives, from a human operator, the predetermined open gate target time (X).

The predetermined open gate target time (X) can be derived from a mold filling simulation.

The controller (60) can generate output signals including, for display on a human readable display (82), the detected arrival time (t$_{DA}$) and the actual open gate time (A).

The controller (60) can receive the predetermined open gate target time (X) from a computer input device (80) that receives, from a human operator, the predetermined open gate target time (X).

The generating steps can be automatically executed by an algorithm executed by the controller (60).

The controller (60) can access profile data (90) comprising a desired profile of valve pin position versus time and the controller generates and transmits signals to the actuator (30) for adjusting the position or velocity of the valve pin (26) to approach or match the desired profile.

In another aspect of the invention there is provided apparatus for initiating flow of fluid material into a gate of a mold cavity during an injection molding cycle, the apparatus comprising:

a manifold (14) that receives a fluid material (4), the manifold having or communicating with a delivery channel (15) that delivers the fluid material under an injection pressure to multiple gates (24) of a mold cavity (18), the multiple gates including an upstream gate (24u) and a downstream gate (24d), each gate having an associated actuator (30) and valve pin (26), and the valve pin being driven by the actuator between a gate closed position GCP and a gate open position GOP, a position sensor (40) associated with the downstream gate that senses initial opening movement (IOM) of the valve pin from the gate closed position toward the gate open position as an actual open gate time (A) and generates an opening signal (S$_O$) indicative of the actual open gate time (A), a cavity sensor (50) that detects a selected physical condition of arrival (DA) of a flow front of the fluid material at a cavity sensor location (CSL) disposed within the mold cavity between the upstream and downstream gates and generates a detection arrival signal (S$_{DA}$) indicative of a time (t$_{DA}$) of the detected arrival of the flow front;

a controller (60), communicating with the cavity sensor (50), position sensor (40) and actuator (30), the controller including instructions for generating output signals to the actuator, wherein, during a first injection molding cycle, the apparatus performs steps of:

detecting, by the cavity sensor (50), the flow front of the fluid material in the cavity at the cavity sensor location (CSL) and transmitting the detection signal (S$_{DA}$) to the controller, the controller (60) generating and transmitting to the downstream actuator, or a control valve that controls the downstream actuator, a gate open signal ($S_{GO}$) at a predetermined open gate target time (X) subsequent to the detected arrival time ($t_{DA}$), sensing, by the position sensor (40), the initial opening movement of the valve pin and transmitting the opening signal with to the controller, the actual open gate time (A) being indicative of a delay time (Y) between the predetermined open gate target time (X) and the actual open gate time (A), the controller generating an adjusted instruction time (X') that comprises the predetermined open gate target time (X) minus the delay time (Y), and during a subsequent injection molding cycle, the apparatus performs steps of:

after the cavity sensor (50) detects and transmits the detection signal ($S_{DA}$) to the controller, the controller (60) transmitting to the downstream actuator (30d) or its control valve a gate open signal at the adjusted instruction time (X') subsequent to the detected arrival time ($t_{DA}$).

In another aspect of the invention there is provided an injection molding system (710) for initiating flow of fluid material (718) into multiple gates of a mold cavity (770) during an injection molding cycle, the system (710) comprising:

a first selected valve (711) comprising a first fluid flow passage (7115) having a first gate (785) to the cavity, a first valve pin (7112) driven reciprocally along an axial upstream downstream path of travel through the first flow passage (7115) by a first actuator (730) between gate open and gate closed positions, one or more downstream valves (711a, 711b, 711c), each downstream valve comprising a downstream fluid flow passage having a downstream gate to the cavity (770) disposed downstream of the first gate (785a), a downstream valve pin (7112a, 7112b, 7112c) driven reciprocally along an axial upstream downstream path of travel through the downstream fluid flow passage (7115a, 7115b, 7115c) by a downstream actuator (730a, 730b, 730c) between a gate open and a gate closed position, a controller (760) receiving a first signal (708, 795b), indicative of a start of injection that feeds the fluid material to the injection molding system, the controller (760) including a set of instructions that instruct the actuator (730a, 730b, 730c) of the valve associated with the at least one selected downstream gate (785a, 785b, 785c) to open the gate by withdrawing the valve pin (7112a, 7112b, 7112c) from the gate closed position at an instruction time (X), the instruction time comprising a predetermined open gate target time (X) based on the first signal, wherein the valve associated with the at least one selected downstream gate further includes a position sensor (732) that detects an actual open gate time (A) upon withdrawal of the valve pin from the at least one selected downstream gate (785a, 785b, 785c), the position sensor (732) sending a signal indicative of the actual open gate time (A) to the controller (760), the controller receiving the signal from the position sensor (732) and including a set of instructions that automatically determines an adjusted instruction time (X') for use on a subsequent injection cycle, wherein the instructions that automatically determines comprises decreasing the time of instruction to the valve pin to open on a subsequent injection cycle by an adjustment time equal to any delay in time (Y) between the predetermined open gate target time (X) and the actual open gate time (A).

The instructions can be performed continuously over a plurality of subsequent injection molding cycles, and wherein the subsequent adjusted instruction time (X") is determined by increasing or decreasing the adjusted instruction time of a prior cycle by an adjustment time equal to the difference in time between the actual open gate time of the prior cycle and the actual open gate time of the present cycle.

The start of injection signal (708) can be transmitted by a controller of an injection molding machine (715) to the controller (760).

In another aspect of the invention there is provided a method comprising:

a controller receiving a first signal, indicative of a start of injection or a position of a screw barrel that feeds fluid material to an injection molding system, and transmits to a downstream actuator a gate open signal at a predetermined open gate target time (X) based on the first signal;

a downstream actuator receiving the gate open signal and initiates withdrawal movement of a downstream valve pin from a downstream gate;

a position sensor detecting actual withdrawal movement of the downstream valve pin from the downstream gate and transmits a signal indicative of the actual gate open time (A) to the controller;

the controller receiving the signal from the position sensor and generates an adjusted instruction time (X') based on the difference (delay time Y) between the actual gate open time (A) and the predetermined open gate target time (X), for use in subsequent cycle.

In such a method the steps can be performed continuously over a plurality of subsequent injection molding cycles, and wherein the subsequent adjusted instruction time (X") is determined by increasing or decreasing the adjusted instruction time of a prior cycle by an adjustment time equal to the difference in time between the actual open gate time of the prior cycle and the actual open gate time of the present cycle.

In another aspect of the invention there is provided an injection molding system (710) for initiating flow of fluid material (718) into multiple gates of a mold cavity (770) during an injection molding cycle, the system (710) comprising:

a first selected valve (711) comprising a first fluid flow passage (7115) having a first gate (785) to the cavity, a first valve pin (7112) driven reciprocally along an axial upstream downstream path of travel through the first flow passage (7115) by a first actuator (730) between gate open and gate closed positions, one or more downstream valves (711a, 711b, 711c), each downstream valve comprising a downstream fluid flow passage having a downstream gate to the cavity (770) disposed downstream of the first gate (785a), a downstream valve pin (7112a, 7112b, 7112c) driven reciprocally along an axial upstream downstream path of travel through the downstream fluid flow passage (7115a, 7115b, 7115c) by a downstream actuator (730a, 730b, 730c) between a gate open and a gate closed position, a controller (760) receiving a first signal (708, 795b), indicative of a start of a position of a barrel screw (716) that feeds the fluid material to the injection molding system, the controller (760) including a set of instructions that instruct the actuator (730a, 730b, 730c) of the valve associated with the at least one selected downstream gate (785a, 785b, 785c) to open the gate on a first injection cycle by withdrawing the valve pin (7112a, 7112b, 7112c) from the gate closed position upon arrival of the barrel screw (716) at a predetermined open gate screw position (OGSP) occurring at an open gate screw position time (OGSPT), wherein the valve associated with the at least one selected downstream gate further includes a position sensor (732) that detects an actual open gate time (A) upon withdrawal of the valve pin from the at least one selected downstream gate (785a, 785b, 785c), the position sensor (732) sending a signal indicative of the actual open gate time (A) to the controller (760), the controller receiving the signal from the position sensor (732) and including a set of instructions that automatically determines an adjusted open gate screw position (OGSP') for use on a subsequent injection cycle, the instructions that automatically determines comprising automatically determining the adjusted screw position (OGSP') to be a position on a subsequent injection cycle that accounts for any delay in time (Y) on the first injection cycle between the open gate screw position time (OGSPT) and the actual open gate time (A).

The instructions can be performed continuously over a plurality of further subsequent injection cycles, wherein the adjusted instruction time (OGSP') of a further subsequent injection cycle is determined to be a position that accounts for any delay in time (Y) between the open gate screw position time (OGSPT) on a prior cycle and the actual open gate time (A) of the further subsequent injection cycle.

Each of the one or more downstream valves typically includes an associated position sensor that detects an actual open gate time (A) upon withdrawal of the valve pin from the associated downstream gate, each associated position sensor sending a signal indicative of the sensed position of each corresponding valve pin to the controller, the controller receiving the signals from each of the associated position sensors, the controller including a set of instructions that accounts for the delay in time (Y) by decreasing the length of travel of the screw on a subsequent injection cycle to a shortened adjusted open gate screw position (OGSP') relative to the open gate screw position (OGSP) that compensates for the delay in time (Y).

In such an apparatus the position of the screw (OGSP, OGSP') is typically detected by a sensor that detects rotational or linear position of the screw at a single position or at multiple positions or continuously along all positions.

BRIEF DESCRIPTION OF THE DRAWINGS

The above and further advantages of the various embodiments of the invention may be better understood by referring to the following description in conjunction with the accompanying drawings in which.

DETAILED DESCRIPTION OF THE INVENTION

Various embodiments of the present invention are now described with reference to the drawings. In the following description, for purposes of explanation, numerous specific details are set forth in order to provide a thorough understanding of one or more implementations of the present invention. It will be evident, however, that the present invention may be practiced without these specific details. In other instances, well-known structures and devices are shown in block diagram form in order to facilitate describing the present invention.

Sequential Valve Gating Apparatus and Method

Figure 1:
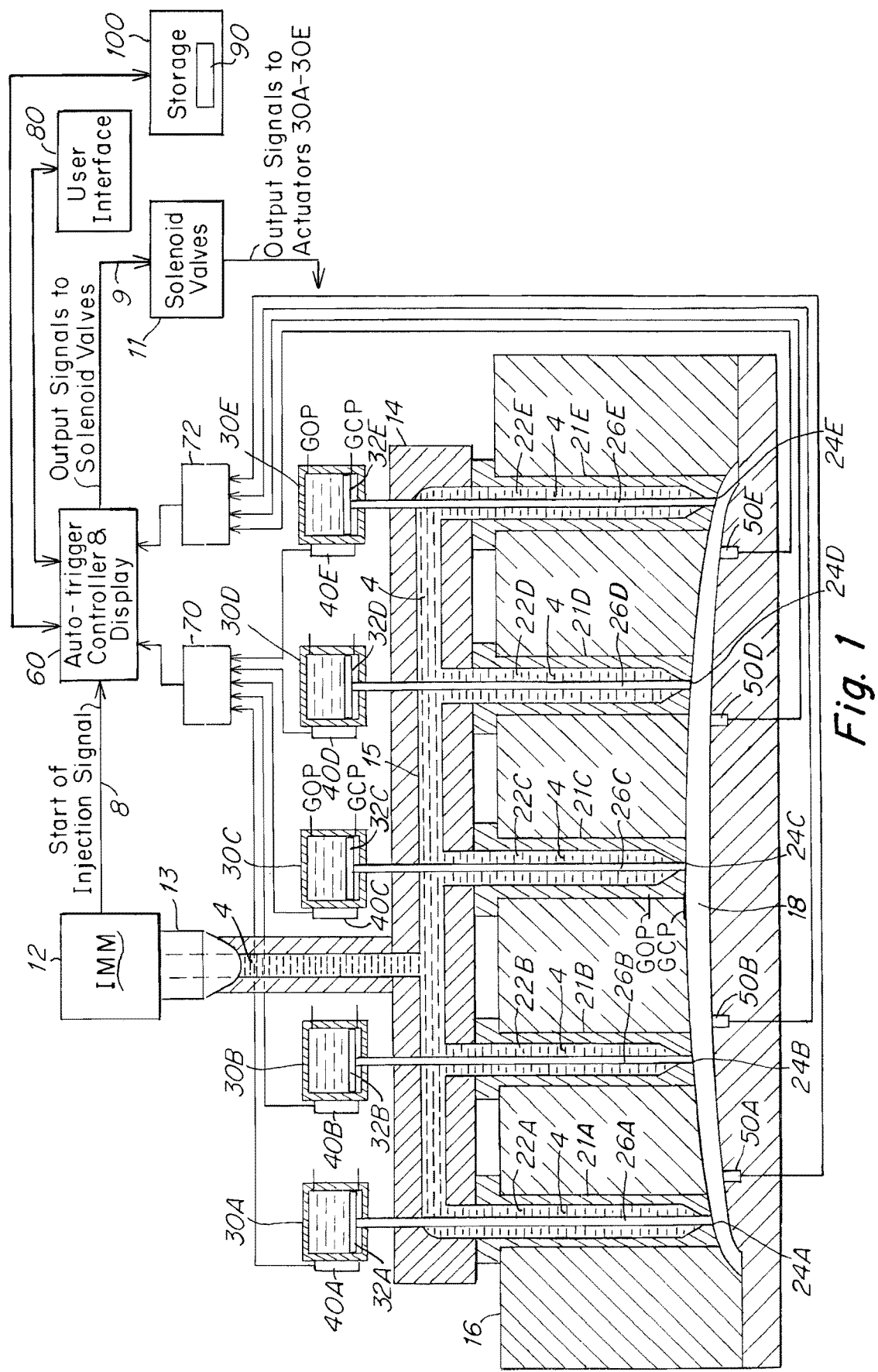
FIG. 1 is a schematic partial sectional view of one embodiment of an injection molding system for performing a sequential valve gating process, in accordance with one embodiment of the invention.

FIG. 1 is a schematic view of a plastic injection molding apparatus for implementing a sequential valve gating process according to one embodiment of the invention. The injection molding system (IMM) 10 includes an injection molding machine 12, a manifold 14, a mold 16 having a mold cavity 18, a valve gating system 20 including a plurality of nozzles 21 that feed the single mold cavity, an actuator 30 associated with each nozzle, and a controller 60 that activates the valve gating system. The system also includes a plurality of downstream cavity sensors 50, and valve gating position sensors 40, utilized in the present embodiment as described below. Signals from the cavity sensors 50 are transmitted to a junction box 70 enroute to controller 60, while signals from position sensors 40 are transmitted to a junction box 72 enroute to controller 60.

More specifically, the injection molding machine 12 feeds a heated molten fluid material 4 (e.g. a plastic or polymer-based fluid material) through a main inlet 13 to a distribution channel 15 of manifold 14. The distribution channel commonly feeds the fluid material to five separate nozzles 21A, 21B, 21C, 21D, 21E, which in turn all commonly feed into a common cavity 18 of a mold 16 to make one molded part. Each nozzle is actuated by an associated actuator 30A, 30B, 30C, 30D and 30E respectively, wherein each actuator drives an associated valve pin 26A, 26B, 26C, 26D and 26E in the associated nozzle, the respective valve pin being driven reciprocally along an axial upstream and downstream path of travel through a flow passage 22A, 22B, 22C, 22D and 22E in the respective nozzle, between a downstream gate closed position (GCP) and an upstream gate open position (GOP), and vice versa, between the GOP and the GCP. Each actuator has a piston 32A-32E controlled by a solenoid valve for moving the associated valve pin between the GOP and GCP positions. The position sensors 40A-40E detect the position of the piston 32, and thus the position of the associated valve pin 26, between GOP and GCP.

The start of an injection cycle is triggered by a "Start of Injection Signal" 8 sent from IMM 12 to the controller 60. The controller then sends output signals 9 to solenoid valves 11 that drive each actuator. In this example, the first gate to open during an injection molding cycle is the central (also referred to as a first upstream) gate 24C of central nozzle 21C controlled by actuator 30C and arranged so as to feed into cavity 18 at an entrance point (gate 24C) that is disposed at about the longitudinal center of the elongated mold cavity 18. As shown in FIG. 1 and subsequent figures, a first adjacent set of lateral downstream nozzles 21B, 21C, disposed laterally adjacent either side of the central nozzle feed fluid material 4 to downstream gates 24B and 24D disposed laterally an equal distance on either side of the central gate 24C. A second set of lateral downstream nozzles 21A, 21E, downstream of the first pair of lateral nozzles 21B and 21D, feed fluid material 4 into the mold cavity at gate locations 24A and 24E respectively that are downstream of the center gate 24C and downstream of the gates 24B and 24E of the first lateral set of nozzles.

Figure 2:
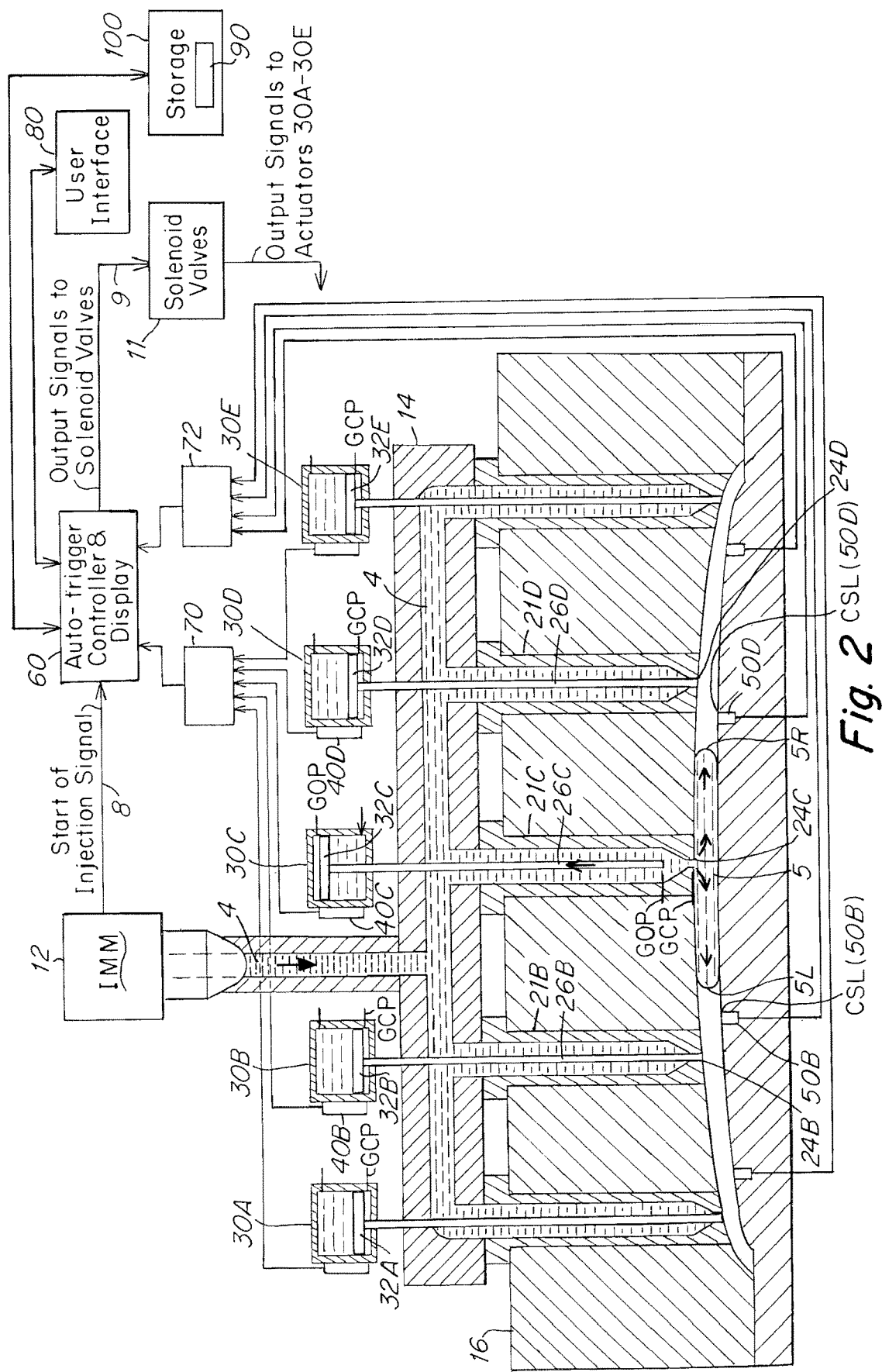
FIG. 2 is a schematic view of the FIG. 1 apparatus at the beginning of an injection sequence, in which a first (center) gate has opened to start a flow of fluid material into a mold cavity.
Figure 3:
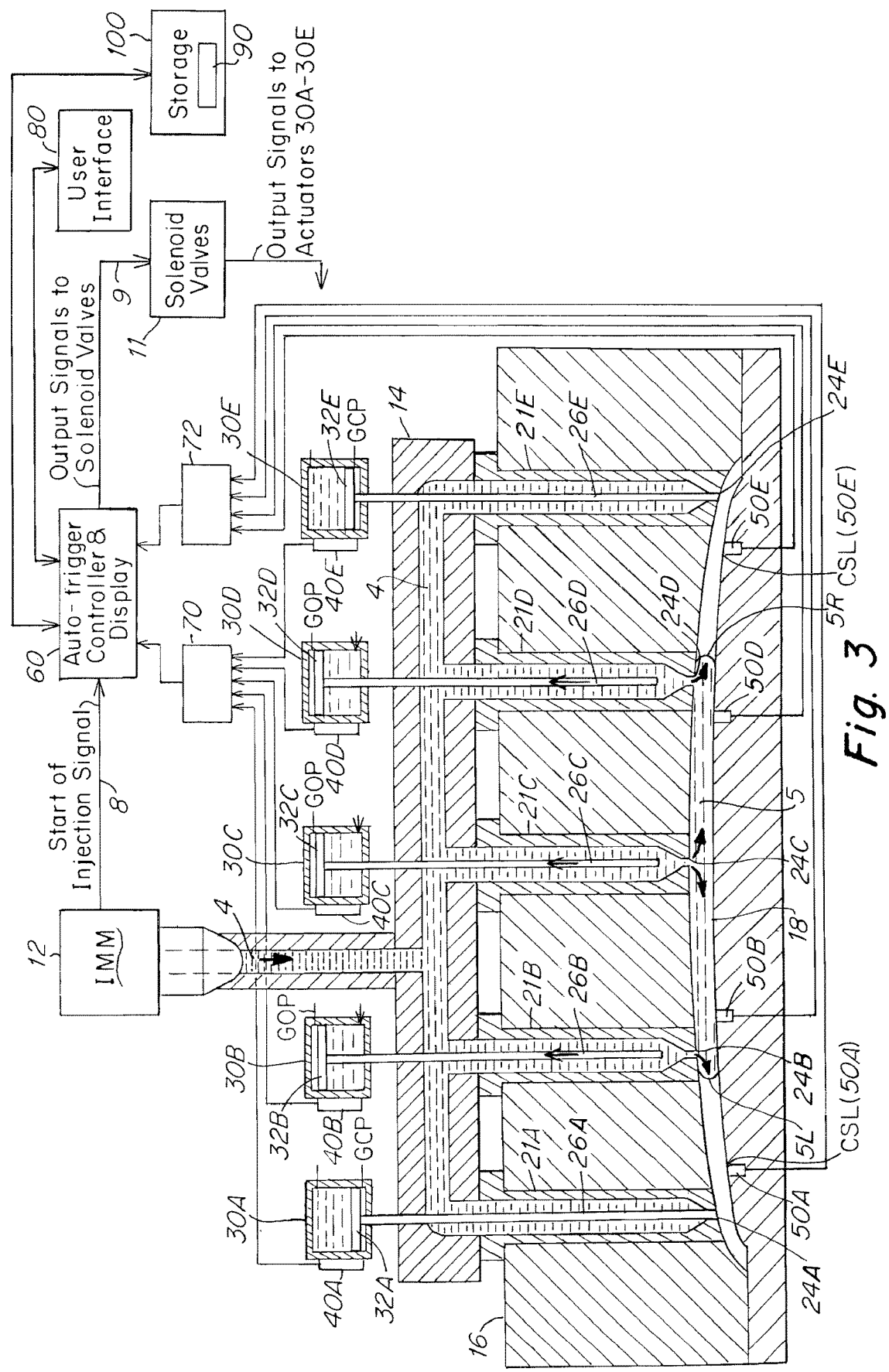
FIG. 3 is a schematic view of the FIG. 1 apparatus, later in the sequence (after FIG. 2), showing a first set of two downstream gates adjacent opposite sides of the center gate now open with fluid material from each of the two downstream gates also entering (flowing into) the mold cavity.
Figure 4:
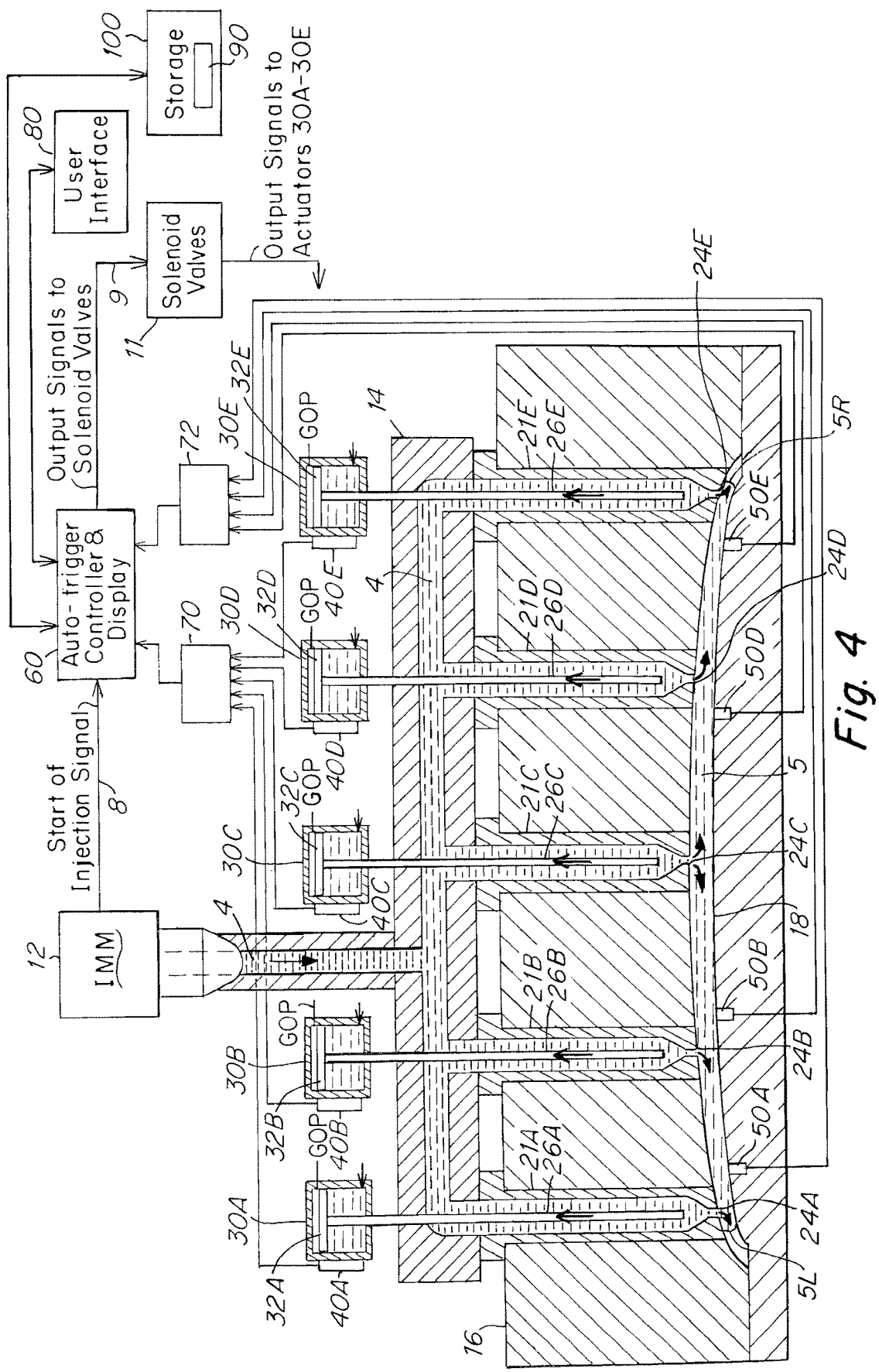
FIG. 4 is a schematic view of the FIG. 1 apparatus, still later in the sequence (after FIG. 3), showing a second set of two downstream gates, each of the second set adjacent and downstream of a respective one of the first set of downstream gates, now open with fluid material from each of the second set (along with fluid material from the center gate and the first set) flowing into the cavity.

As illustrated in FIGS. 2-4 and described further below, the injection cycle is a cascade process where injection is effected in a sequence from the center nozzle 21C and then at a later predetermined time from the first set of downstream nozzles 21B, 21D, and at a still later predetermined time from the second set of further downstream nozzles 21A, 21E. As shown in FIG. 2, the injection cycle is started by first opening the center gate 24C into mold cavity 18 by withdrawing the distal tip 27C of the center valve pin 26C from the gate 24C and allowing fluid material 4 to flow outwardly from nozzle passage 22C into the cavity and form a flow stream 5 moving in opposing lateral directions from the center gate 24C, creating two opposing flow fronts 5R (moving laterally to the right toward next downstream gate 24D) and 5L (moving laterally to the left toward next downstream gate 24B). In accordance with the present embodiment, a plurality of cavity sensors 50B, 50C, 50D and 50E are disposed in or adjacent to the mold cavity 18 for detecting the arrival of flow fronts 5R and 5L at each respective cavity sensor location (CSL) (also referred to as a trigger location). More specifically, between each adjacent set of upstream and downstream nozzle gates, there is disposed a respective cavity sensor for detecting when the flow front reaches the vicinity of the downstream gate, referred to herein as a detection arrival DA. As described later below, when this occurs, a signal is sent to the controller 60 to cause a sequence of subsequent actions that initiate withdrawal of the valve pin of the associated downstream gate (by sending a signal to the downstream actuator to open the downstream valve gate at a predetermined open gate target time (X), specific to that gate, as well as monitoring and detection of the actual open gate time (A) of withdrawal of the valve pin from the downstream gate and generating a signal (sent to controller 60) indicative of actual open gate time (A). The controller then determines whether there is a difference between the predetermined open gate target time (A) and the actual open gate time (A). This difference, referred to as a delay time (Y), can be used to modify the instruction time for initiating withdrawal of the downstream valve pin from the downstream gate during a next or subsequent injection cycle, with a goal toward minimizing or eliminating the time difference.

More specifically, FIG. 2 shows the opposing flow fronts 5R and 5L moving toward the first set of lateral downstream gates 24D and 24B. When the flow front 5R is adjacent to or at the cavity sensor 50D associated with downstream gate 24D (of nozzle 21D), the cavity sensor detects a selected physical condition (e.g., temperature) that signals arrival of the flow front of the fluid material at the cavity sensor location CSL (50D) located between the upstream gate 24C and the downstream gate 24D, and generates a detection arrival signal $S_{DA}$ indicative of the time $t_{(DA)}$ of the detected arrival of the flow front 5R. This detection arrival signal is sent to controller 60 to initiate an instruction signal to actuator 40D (associated with nozzle 21D) to cause subsequent withdrawal of the distal tip of valve pin 24D from gate 24D at a predetermined open gate target time (X) subsequent to the detected arrival time $t_{(DA)}$. A similar series of events occurs for the opposing flow front 5L as it reaches the cavity sensor 50B and generates a detection arrival signal for initiating a subsequent withdrawal of valve pin 26B from gate 24B.

FIG. 3 shows the sequential injection process at a later time in which, following the opening of the first set of lateral downstream gates 24D and 24B whereby fluid material 4 from those gates joins the initial stream (from center gate 24C) to form a combined flow stream 5, the opposing flow fronts 5R and 5L have moved past gates 24D and 24B and are now moving towards the respective second lateral set of downstream nozzle gates 24E and 24A. The respective flow fronts 5R and 5L will be detected by a second set of cavity sensors 50E and 50A associated with the second set of downstream gates 24E and 24A (of nozzles 21E and 21A) for similarly triggering initiation of withdrawal of the respective valve pins 26E and 26A from the second set of downstream valve gates 24E and 24A. The detection will occur as the flow fronts move from the locations shown in FIG. 2 further downstream to a time the flow front arrivals are detected by the cavity sensors 50E and 50A. Similarly, this detection will case the sensors 50E and 50D to generate and send signals $S_{DA}$ controller 60 with times indicative of the detected arrival $t_{(DA)}$, thereby initiating the controller to send gate open signals $S_{GO}$ to the respective actuators 30E and 30A associated with the respective nozzles 21E and 21A to open the respective gates by withdrawing the respective valve pins 26E and 26A at instruction times (X) comprising the predetermined open gate target times (X) for the respective nozzles. The positions of these valve pins will be monitored by position sensors 40E and 40A for the actual open gate time (A) upon withdrawal of the respective valve pins from the gates, the position sensors sending the controller signals indicative thereof whereby the controller can then compare (A) and (X) to determine whether a timing difference exists. If the actual open gate is different from the predetermined open gate target time, the instruction time (X) can be automatically adjusted for use in a subsequent injection cycle in an attempt to eliminate any difference between the instruction time and the actual gate open time during the subsequent injection cycle.

The above process will continue until all nozzles are open and the molded part is filled. Typically, the valve pins all remain open until the end of a packing period, and then the valve gates are closed by a signal from the injection machine.

Thus, in accordance with the present invention, adjustments to the instruction time (X) for use in a subsequent cycle can be made where there is a detected difference (delay Y) between the predetermined open gate target time (X) (desired opening time) and actual open gate time (A). Modification of the instruction time (X) can be automatically accomplished by the controller and utilized in the next cycle. Still further, if a valve pin fails to open or is slow in opening, the system may provide an alarm that is activated by such an event.

By way of example, the predetermined open gate target time (X) may be 0.3 seconds, and the actual open gate target time (A) may be 0.4 seconds, meaning there is a difference or delay Y of 0.1 seconds (0.4−0.3=0.1). The adjusted instruction time $X^1$ is then determined to be X−Y, namely 0.3−(0.4−0.3)=0.2 seconds. On the next or subsequent cycle the modified instruction time (X') will be 0.2 seconds.

It has been found that triggering based on the flow front detection, instead of the time or screw position, can significantly enhance the quality of the molded parts. It can also substantially reduce the set-up time and reduce the need for highly experienced operators. The triggering process can be used to automatically adjust the open gate instruction time (X) when melt viscosity changes, from one cycle to the next. The actual valve pin opening times can be displayed on a user interface (e.g., a computing device 80 with a display and user input as shown in FIG. 1), thus enabling an operator to monitor the performance of the sequential process and make manual adjustments (e.g., to the timing, temperature, pressure or other system parameters) if desired.

Figure 5:
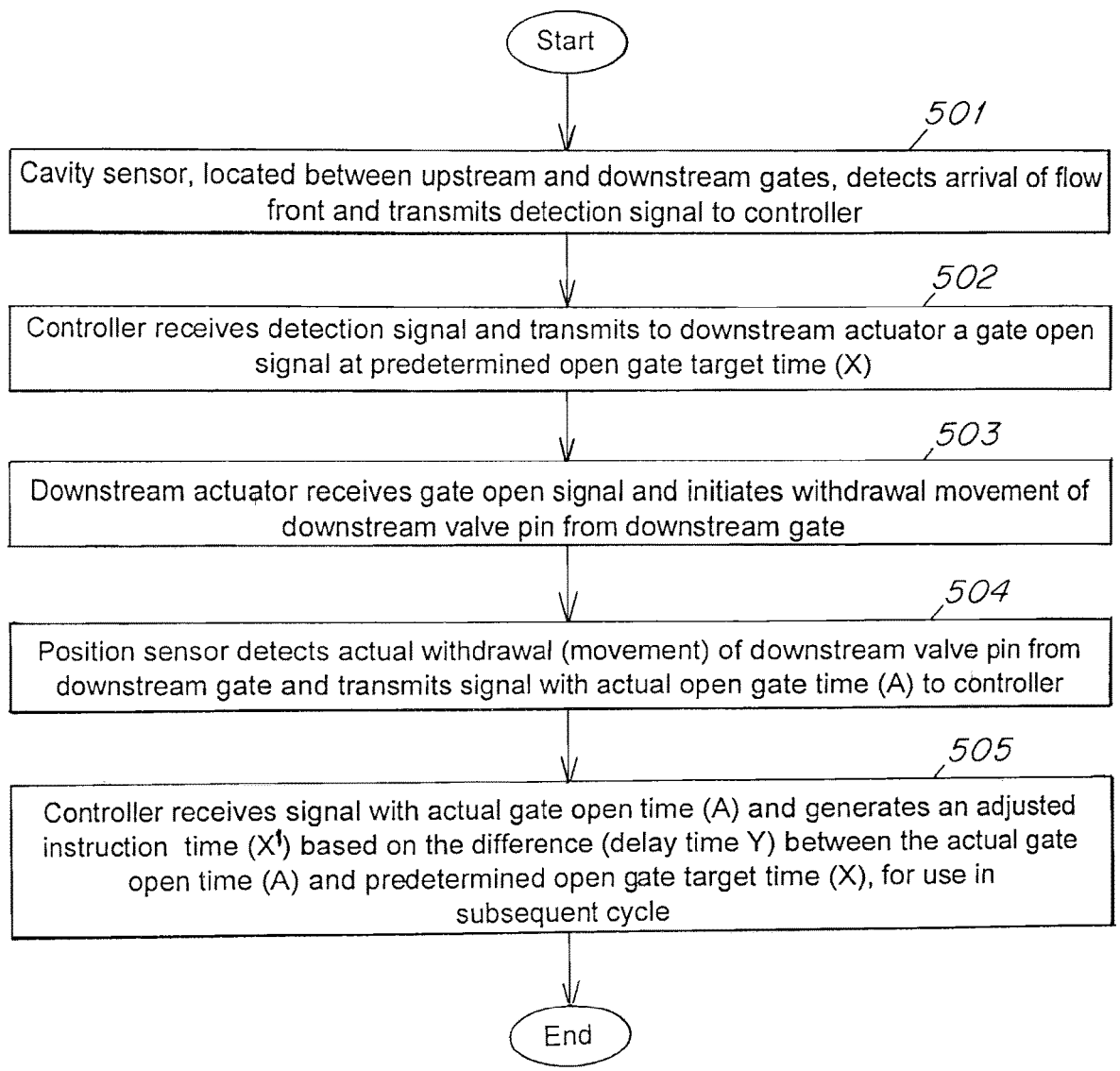
FIG. 5 is a flow chart showing one embodiment of a sequence of steps according to one method embodiment of the invention.

FIG. 5 is a flowchart showing a sequence of steps 501-505 according to one method embodiment comprising:

cavity sensor, located between upstream and downstream gates, detects arrival of flow front and transmits detection signal to controller (step 501)

controller receives detection signal and transmits to downstream actuator a gate open signal at predetermined open gate target time (X) (step 502)

downstream actuator receives gate open signal and initiates withdrawal movement of downstream valve pin from downstream gate (step 503)

position sensor detects actual withdrawal (movement) of downstream valve pin from downstream gate and transmits signal with actual gate open time (A) to controller (step 504)

controller receives signal with actual gate open time (A) and generates an adjusted instruction time (X') based on the difference (delay time Y) between the actual gate open time (A) and predetermined open gate target time (X), for use in subsequent cycle (step 505).

The following timing sequence illustrates one embodiment of the invention:

| Timing Sequence | |
|---|---|
| Time | Event |
| $t_{0a}$ | start of cycle a |
| $t_{1a}$ | predetermined start injection time for center gate to open |
| $t_{2a}$ | cavity sensor located between center gate and first downstream gate detects flow front |
| $t_{3a}$ | predetermined open gate target time for first downstream gate to open |
| $t_{4a}$ | actual open gate time first downstream gate opens (based on opening movement of valve pin) |
| . . . | |
| $t_{0b}$ | start of subsequent cycle b |
| $t_{1b}$ | predetermined start injection time for center gate to open |
| $t_{2b}$ | cavity sensor located between center gate and first downstream gate detects flow front |
| $t_{3b}$ | Adjusted instruction time for first downstream gate to open (based on difference between predetermined open gate target time $t_{3a}$ and actual open gate time $t_{4a}$ in cycle a) |
| . . . | |

The preselected condition (e.g., physical property) of the fluid that the cavity sensor detects (senses) may be from example, pressure or temperature. As used herein, the detection (sensing) includes one or more of a numerical value or a change in value of the property.

The position sensor may be any of various known sensors such as a hall effect sensor as described in Tan et al., U.S. Pat. No. 9,144,929 issued Sep. 29, 2015 entitled "Apparatus and Method of Detecting a Position of an Actuator Position," assigned to Synventive Molding Systems, the disclosure of which is incorporated by reference as if fully set forth in its entirety herein. Alternatively, the position sensor may be an encoder (e.g., for use with an electronic actuator).

The actuation system as shown comprises a fluid driven actuator 30. A preferred fluid driven valve system comprises a fast acting linear force motor driven proportional valve that regulates the flow of either gas or liquid to the actuator 30, namely either a pneumatic or hydraulic system. A fast acting fluid control valve system is described in detail in PCT/US2014/31000 and in U.S. Pat. No. 5,960,831, the disclosures of both of which are incorporated herein by reference can be used in the apparatuses described herein particularly where pneumatic valve control systems are preferred for the particular application.

Alternatively, an electronic (electrically powered) actuator system, having an electric motor rotor interconnected to the valve pin, may be used. See for example the electrically powered actuator systems disclosed in U.S. Pat. Nos. 6,294,122, 9,492,960, and 9,498,909, the disclosures of which are incorporated by reference as if fully set forth in their entirety herein.

Another Embodiment

Figure 6:
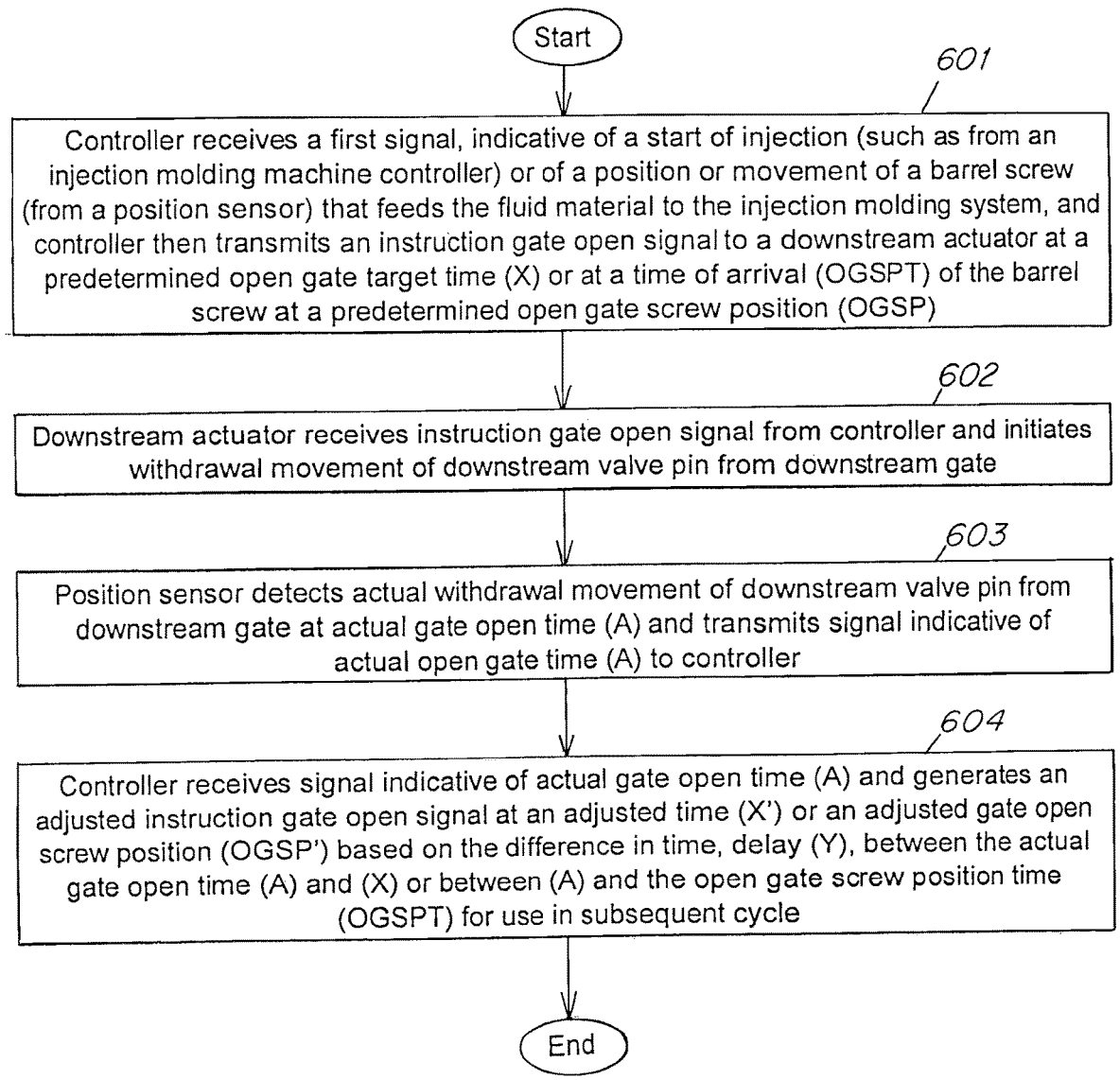
FIG. 6 is a flow chart of another embodiment of a sequence of steps according to another method embodiment of the invention.
Figure 7:
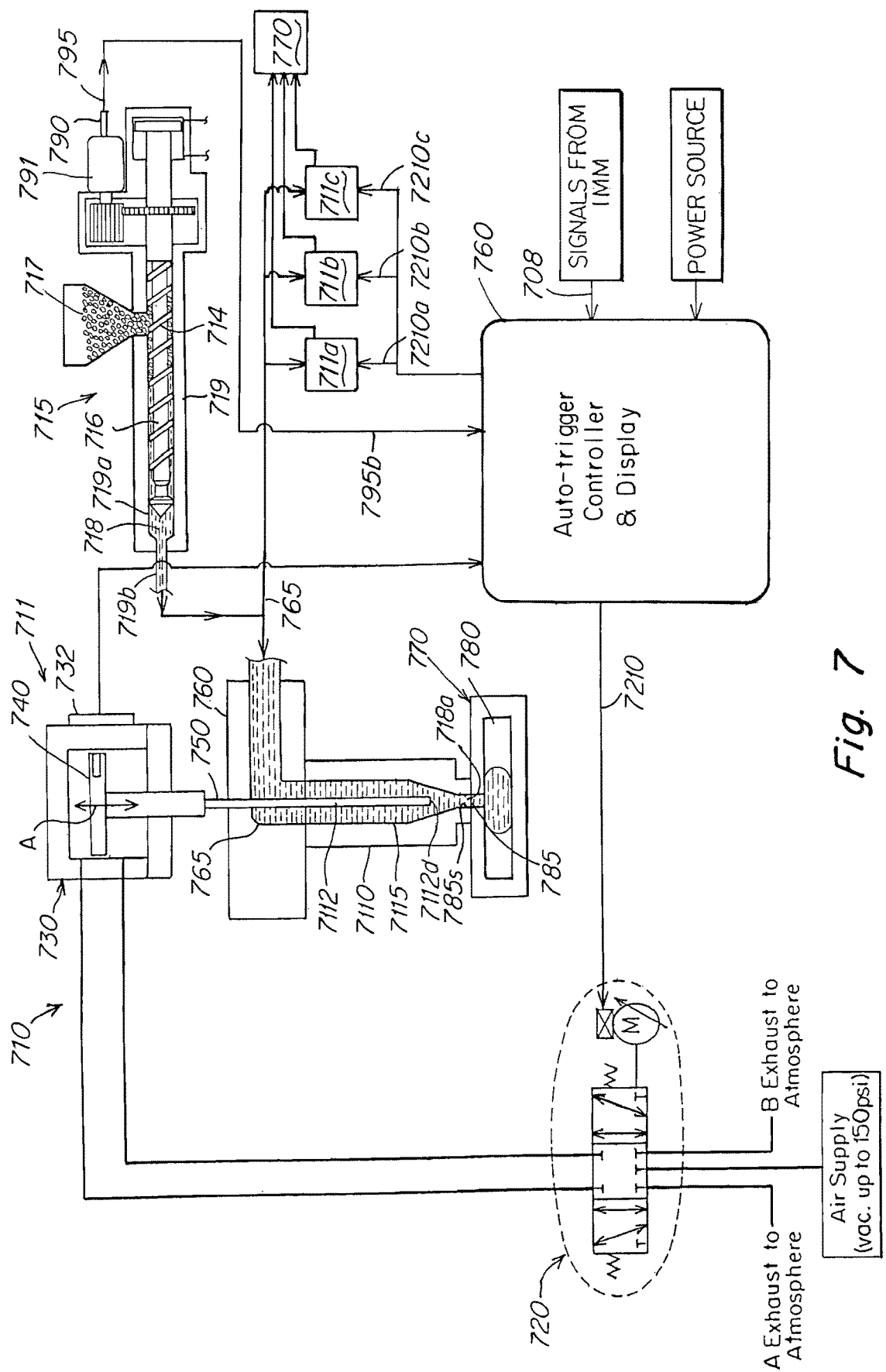
FIG. 7 is a schematic view of an apparatus for implementing the method of FIG. 6.
Figure 8:
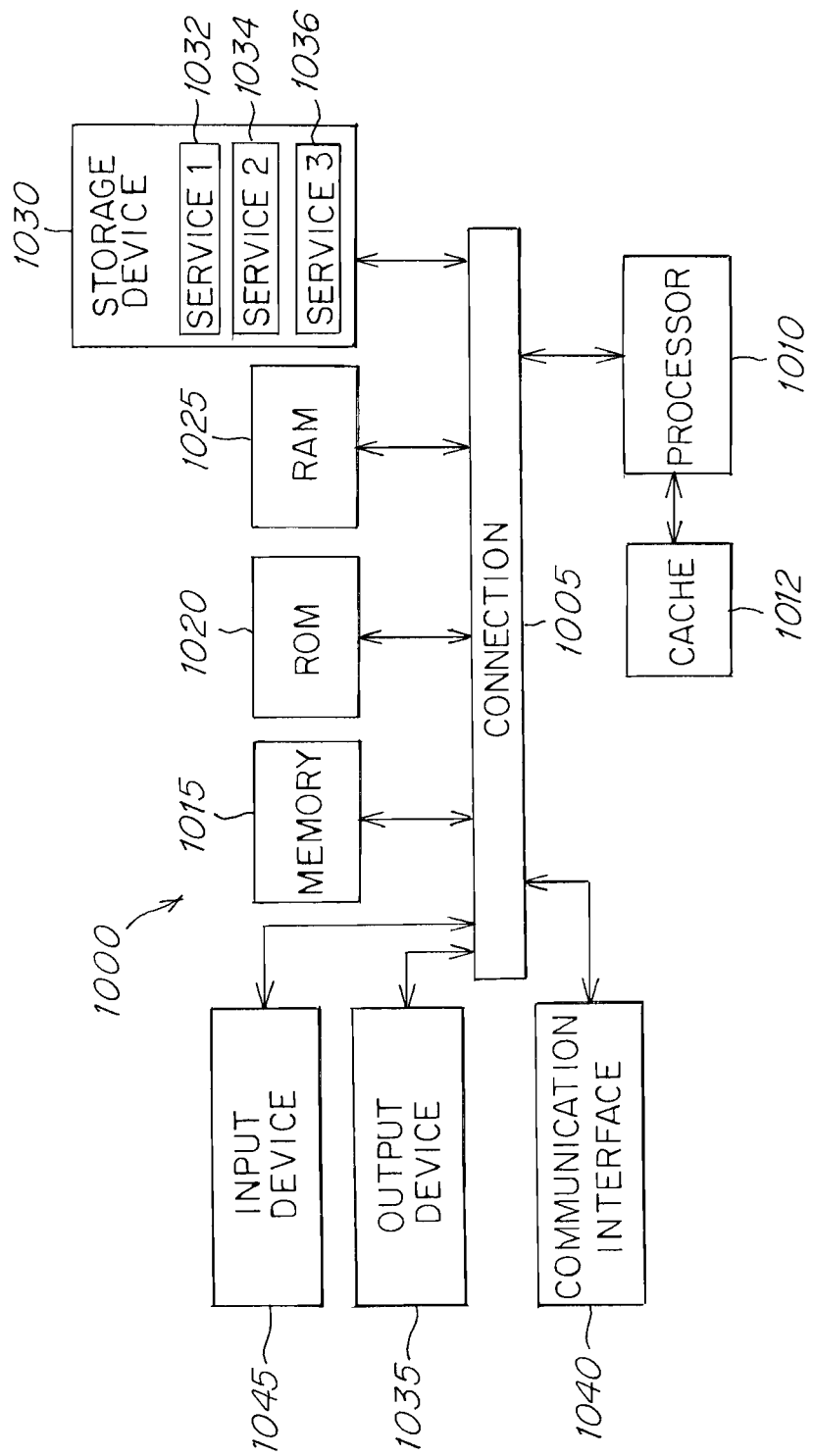
FIG. 8 illustrates an example computing device.

In another embodiment, instead of triggering based on detecting the flow front in the cavity, the triggering is based on a start of injection cycle or screw position in the barrel. FIG. 6 illustrates a method according to this embodiment, and FIG. 7 illustrates an apparatus that can be used in this embodiment.

FIG. 6 is a flowchart showing a sequence of steps 601-604 according to one method embodiment comprising:

controller receives a first signal, indicative of a start of injection or a position of a barrel screw that feeds the fluid material to the injection molding system, and transmits to a downstream actuator a gate open signal at a predetermined open gate target time (X) based on the first signal (step 601)

downstream actuator receives gate open signal and initiates withdrawal movement of downstream valve pin from downstream gate (step 602)

position sensor detects actual withdrawal (movement) of downstream valve pin from downstream gate and transmits signal indicative of the actual gate open time (A) to controller (step 603)

controller receives signal indicative of actual gate open time (A) and generates an adjusted instruction time (X') based on the difference (delay time Y) between the actual gate open time (A) and predetermined open gate target time (X), for use in subsequent cycle (step 604).

FIG. 7 shows one system embodiment 710 of the invention comprised of an injection machine 715 that feeds melt-able injection material that is converted from solid form 717 into molten or liquid flowing fluid material form 718 within the barrel 719 of the machine 715 by a screw 716. The screw 716 is controllably rotated at a selected rate such that the helical threads 714 of the screw 716 drive the molten fluid material 718 downstream under a controllably variable pressure and controllably variable amount of fluid into a fluid distribution channel 765 of a hot runner or manifold

760 depending on the rate and degree of rotation of the screw 716. The fluid distribution channel 765 can commonly feed into the downstream flow passage(s) 7115 of the injection nozzle(s) 7110 of one or more of multiple valve gates or valves 711, 711a, 711b, 711c.

Each valve 711, 711a, 711b, 711c is comprised of an actuator 730 and a mounted nozzle 7110. Each nozzle 7110 of each valve 711, 711a, 711b, 711c routes the molten fluid material 718 that is received from a single common source (fed from barrel 719, through an inlet 719b that interconnects the barrel to the manifold, and then through the common manifold channel 765 through a nozzle passage 7115 to and ultimately through a respective gate 785, 785a, 785b, 785c of the nozzles associated with each valve 711, 711a, 711b, 711c to a single cavity 780 of a mold 770. Here, each of the multiple valves 711, 711a, 711b, 711c inject into the mold cavity 780 (typically in a cascade or sequential manner) during the course of a single injection cycle as previously described (with respect to the prior embodiment of FIG. 1).

The system 710 employs a sensor 790 that senses or detects a linear or rotational position of the barrel screw 716, at a start or initial portion of the injection cycle such that detection of initial movement or a selected position of the screw 716 by the sensor 790 can be used to define the start or start time of an injection cycle. The sensor 790, which in this embodiment is shown as detecting the rotational position of a motor 791 that drivably rotates the screw 716, the rotational position of the motor 791 corresponding to the rotational or linear position of the screw. A predetermined open gate screw position OGSP is selected by the user. The position sensor 790 detects the predetermined open gate screw position OGSP and sends a signal 795 indicative of that position (or the time OGSPT associated with detecting such position) to the controller 760. The signal 795 that is sent to controller 760 may be a continuous real time signal indicative of the screw position along its entire course of rotation or path of travel. Detection by the position sensor 790 of the original predetermined open gate screw position OGSP and any subsequently automatically adjusted open gate screw positions (OGSP') are used as triggers by the controller to instruct the downstream valves 711a, 711b, 711c and their associated gates to open on the first and subsequent injection cycles.

The controller 760 includes instructions that use the received signal 795 as a control value that controls one or more valve pins 7112 of the one or more valves 711, 711a, 711b, 711c such that the one or more valve pins 7112 are driven through an upstream path of travel beginning from the gate closed position to open the respective valve gate, at a predetermined open gate target time (X) for the respective gate. In one embodiment, the valve 711 may be designated as the first upstream gate to open, followed by subsequent openings of the remaining gates 785a, 785b and 785c each at their respective predetermined open gate target times (X) as triggered by the start signal 795. In another embodiment, the IMM sends a start of injection signal 708 that is used as the control value and trigger to open the respective gates, instead of the screw position signal 795. In this later embodiment, the screw position sensor 790 and signal 795 are not required.

FIG. 7 illustrates the components of one valve 711 in detail. For ease of explanation, each valve 711a, 711b, 711c is typically comprised of the same components as described with reference to valve 711, each valve being commonly fed by the injection fluid material 718 flowing from barrel 719 through inlet 719b to the manifold and further flowing through downstream manifold channel 765. Manifold channel 765 is shown and referred to as one example of a common fluid flow channel.

As shown, the distal end of nozzle 7110 has a gate 785 (here the upstream gate to the mold cavity 780) that is controllably openable and closeable by a valve pin 7112 to start and stop the flow of material 718 through gate 785. Such controlled gate opening and closing is effected by controlled reciprocal upstream and downstream movement A of valve pin 7112 that is controllably driven by a pneumatic actuator 730 that is in turn controllably driven most preferably by a fast acting linear force motor or valve 720. The downstream distal tip end of the valve pin 7112 initially closes the gate 785 at the start of an injection cycle. When an injection cycle is initiated the valve pin 7112 is withdrawn upstream opening the upstream gate 785 and allowing the molten fluid material 718 to flow through the gate 785 into the cavity 780 of the mold 770. The downstream gates 785a, 785b, 785c are then open in sequence at each of their predetermined open gate times. Valve pin position sensors 732, similar to position sensors in FIG. 1, are mounted on each actuator 730 for each valve 711, and used to detect the actual open gate time (A) of the respective downstream gate which is then compared with the predetermined open gate target time (X) for the respective downstream gate, in order to determine an adjustment time equal to any delay in time (Y) between the predetermined open gate time (X) and the actual open gate time (A). See the discussion in the prior embodiment of FIGS. 1-5 regarding use of the valve pin position sensors 40 and determination of an adjusted instruction time (X') for use on a subsequent injection cycle.

Returning to the FIG. 7 embodiment, at time zero of the injection cycle (start of injection signal received from the IMM 715 or screw position signal 795 received from the sensor 790), the first upstream valve 711 is initially opened (with all other downstream valves 711a, 711b, 711c remaining closed) and the screw 716 is simultaneously started up to begin rotating and thus increasing the pressure in barrel 719a, inlet 719b from an initial zero up to a desired level. At a later time the second valve pin associated with the second valve 711a is initially withdrawn from its associated gate. With the first and second valves 711, 711a now open and third and fourth valves 711b, 711c still closed, the pressure is increased as the screw continues to inject injection fluid into the system until the pressure reaches a desired pressure when the pin associated with the third valve 711b is opened from its associated gate. Now with the first and second and third valves 711, 711a, 711b open and valve 711c still closed, the pressure is increased as the screw continues to inject injection fluid into the system until the pressure reaches a desired pressure at which time the pin associated with the fourth valve 711c is withdrawn from tis associated gate. With all four valves now open and the screw under constant power drive force, the pressure continues to rise up to a final constant or steady pressure.

In embodiments where the controller 760 controls all of the multiple valve gates 711, 711a, 711b, 711c during an injection cycle, the controller 760 includes a pin sequence instruction that can instruct and execute the opening and upstream pin withdrawal movement of each separate valve 711, 711a, 711b, 711c in any preselected timed sequence.

The actuators associated with gates 711, 711a, 711b, 711c typically comprise a pneumatic or hydraulic actuator or can also comprise an electric actuator, the controller 760 being adapted to control the drive mechanism for each such kind of actuator. In the case of a pneumatically or hydraulically driven actuator, the drive mechanism is an electrically drivable mechanism interconnected to a fluid flow control valve similar to valve 720. In the case of an electric actuator the drive mechanism is typically an electric motor that is controllably drivable by an electronic controller 760.

Each separate valve 11, 11a, 11b, 11c can feeds into a single cavity 780 of a single mold or can each feed separately into separate cavities of separate molds (not shown for valves 11a, 11b, 11c).

In order to reduce or eliminate the visibility of the lines or blemishes in the final molded part, a fast acting motor 20 that acts as the actuator for a valve can be employed.

The controller 760 instructs the actuators 730 et al. associated with the gates via signals 210, 210a, 210b, 210c generated by an algorithm contained in the electronic controller 760 to withdraw the pins associated with the valves 711, 711a, 711b, 711c at an upstream withdrawal velocity that can be controlled along any portion of the upstream or downstream travel path or stroke of the valve pins.

In a typical embodiment, the first valve 711 is initially opened with all other downstream valves 711a, 711b, 711c being closed until instructed to sequentially open at sequentially subsequent times as described herein.

Computing Device

FIG. 6 illustrates an example computing system architecture 1000 wherein the components of the system 1000 are in communication with each other using a connection 1005. Connection 1005 can be a physical connection via a bus, or direct connection into processor 1010 such as in a chipset architecture. Connection 1005 can also be a virtual connection, networked connection, or logical connection. The connection can be wired or wireless (such as a Bluetooth connection).

In some cases, the system 1000 is a distributed system, wherein the functions described with respect to the components herein can be distributed within a datacenter, multiple datacenters, geographically, etc. In some embodiments, one or more of the described system components represents many such components each performing some or all of the function for which the component is described. In some embodiments, the components described herein can be physical or virtual devices.

Example system 1000 includes at least one processing unit (CPU or processor) 1010 and a connection 1005 that couples various system components including system memory 1015, such as read only memory (ROM) 1020 and random access memory (RAM) 1025 to the processor 1010. The system 1000 can include a cache of high-speed memory 1012 connected directly with, in close proximity to, or integrated as part of the processor 1010.

The processor 1010 can include any general purpose processor and a hardware service or software service, such as service 1 1032, service 2 1034, and service 3 1036 stored in storage device 1030, configured to control the processor 1010 as well as a special-purpose processor where software instructions are incorporated into the actual processor design. The processor 1010 may essentially be a completely self-contained computing system, containing multiple cores or processors, a bus, memory controller, cache, etc. A multi-core processor may be symmetric or asymmetric.

To enable user interaction with the computing device 1000, an input device 1045 can represent any number of input mechanisms, such as a microphone for speech, a touch-sensitive screen for gesture or graphical input, keyboard, mouse, motion input, speech and so forth. An output device 1035 can also be one or more of a number of output mechanisms known to those of skill in the art. In some instances, multimodal systems can enable a user to provide multiple types of input to communicate with the computing device 1000. The communications interface 1040 can generally govern and manage the user input and system output. There is no restriction on operating on any particular hardware arrangement and therefore the basic features here may easily be substituted for improved hardware or firmware arrangements as they are developed.

Storage device 1030 can be a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1025, read only memory (ROM) 1020, and hybrids thereof.

The storage device 1030 can include code that when executed by the processor 1010, causes the system 1000 to perform a function. A hardware service that performs a particular function can include the software component stored in a computer-readable medium in connection with the hardware components, such as the processor 1010, bus 1005, output device 1035, and so forth, to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" refers to at least one of a set and indicates that one member of the set or multiple members of the set satisfy the claim. For example, claim language reciting "at least one of A and B" means A, B, or A and B.

While specific embodiments of the present invention have been shown and described, it will be apparent that many modifications can be made thereto without departing from the scope of the invention. Accordingly, the invention is not limited by the foregoing description.

What is claimed is:

1. A method of operating an injection molding system for initiating flow of a fluid material into multiple gates of a mold cavity during an injection cycle, wherein the system includes:
   a first selected valve comprising a first fluid flow passage having a first gate to the cavity, a first valve pin driven reciprocally along an axial upstream downstream path of travel through the first flow passage by a first actuator between gate open and gate closed positions,
   one or more downstream valves, each downstream valve comprising a downstream fluid flow passage having a downstream gate to the cavity disposed downstream of the first gate, a downstream valve pin driven reciprocally along an axial upstream downstream path of travel through the downstream fluid flow passage by a downstream actuator between a gate open and a gate closed position the method comprising:
   detecting, at a downstream detection time, a select property of a flow front of the fluid material flowing downstream at a trigger position within the cavity disposed between the first gate and at least one selected downstream gate wherein,
   instructing the actuator of the valve associated with the at least one selected downstream gate, or a control valve for that actuator, to withdraw the valve pin from the gate closed position at an instruction time (X) comprising a predetermined open gate target time (X) following the downstream detection time,
   detecting, at an actual open gate time, withdrawal of the valve pin from the at least one selected downstream gate,
   determining an adjusted instruction time (X'), for use on a subsequent injection cycle, wherein the determining step comprises decreasing the time of instruction to the valve pin to open on a subsequent injection cycle by an adjustment time equal to any delay in time (Y) between the predetermined open gate target time (X) and the actual open gate time (A).

2. A method according to claim 1 further comprising operating the system described above to cause the actuator of the valve associated with the at least one selected downstream gate to withdraw the valve pin from the gate closed position at the adjusted instruction time (X') following the downstream detection time.

3. A method according to claim 1 wherein the determining step is performed continuously over a plurality of subsequent injection molding cycles, and wherein the subsequent adjusted instruction time (X") is determined by increasing or decreasing the adjusted instruction time of a prior cycle by an adjustment time equal to the difference in time between the actual open gate time of the prior cycle and the actual open gate time of the present cycle.

4. A method according to claim 1
   the multiple gates of the cavity including an upstream gate and a downstream gate, each gate having an associated actuator and valve pin, and the valve pin being driven by the actuator between a gate closed position (GCP) and a gate open position (GOP),
   a position sensor associated with the downstream gate that detects withdrawal of the valve pin from the gate closed position toward the gate open position at an actual open gate time (A) and generates an opening signal ($S_O$) indicative of the actual open gate time (A),
   a cavity sensor that detects a selected physical condition of arrival (DA) of a flow front of the fluid material at a cavity sensor location (CSL) disposed within the mold cavity between the upstream and downstream gates and generates a detection arrival signal ($S_{DA}$) indicative of a time ($t_{DA}$) of the detected arrival of the flow front;
   a controller, communicating with the cavity sensor, position sensor and actuator, the method comprising steps of:
during a first injection molding cycle:
   detecting, by the cavity sensor, the arrival of the flow front of the fluid material in the cavity at the cavity sensor location (CSL) and transmitting the detection signal ($S_{DA}$) to the controller,
   the controller generating and transmitting to the downstream actuator, or a control valve that controls the downstream actuator, a gate open signal ($S_{GO}$) at an instruction time comprising a predetermined open gate target time (X) subsequent to the detected arrival time ($t_{DA}$),
   sensing, by the position sensor of the downstream gate, withdrawal of the valve pin and transmitting the opening signal ($S_O$) to the controller with the actual open gate time (A), the actual open gate time (A) being indicative of a delay time (Y) between the predetermined open gate target time (X) and the actual open gate time (A),
   the controller generating an adjusted instruction (X') time comprising the predetermined open gate target time (X) minus the delay time (Y), and
during a subsequent injection molding cycle, after the cavity sensor detects and transmits the detection signal ($S_{DA}$) to the controller, the controller transmitting to the downstream actuator or its control valve a gate open signal ($S_{GO}$) at the adjusted instruction time (X') subsequent to the detected arrival time ($t_{DA}$).

5. A method according to claim 4 comprising:
providing, for a plurality of adjacent upstream and downstream gate pairs, the associated position and cavity sensors and performing the method steps during the first and subsequent injection molding cycles, and
wherein the subsequent adjusted instruction time (X') is determined by increasing or decreasing the adjusted instruction time of a prior cycle by an adjustment time equal to the difference in time between the actual open gate time of the prior cycle and the actual open gate time of the present cycle.

6. A method according to claim 4 wherein the upstream gate is a first upstream gate that initiates an initial flow front into the cavity.

7. A method according to claim 4 wherein the actuator associated with the first upstream gate receives a start of cycle signal ($S_{SC}$) from the controller or an injection molding machine and in response thereto the actuator initiates opening movement of the valve pin for the first upstream gate.

8. A method according to claim 4 wherein the cavity sensor is a temperature sensor.

9. A method according to claim 4 wherein the position sensor is a hall effect sensor.

10. A method according to claim 4 wherein the position sensor senses movement of an actuator piston that drives the valve pin.

11. A method according to claim 4 wherein the actuator includes a solenoid valve that is activated by the gate open signal ($S_{GO}$) to drive the valve pin from the gate closed position (GCP) toward the gate open position (GOP).

12. A method according to claim 4 wherein the actuator is an electronic actuator and the position sensor is an encoder.

13. A method according to claim 4 wherein the method steps are performed continuously over a plurality of subsequent injection molding cycles, and wherein the subsequent adjusted instruction time (X') is determined by increasing or decreasing the adjusted instruction time of a prior cycle by an adjustment time equal to the difference in time between the actual open gate time of the prior cycle and the actual open gate time of the present cycle.

14. A method according to claim 4 further comprising performing a trial injection molding cycle to determine the predetermined open gate target time (X).

15. A method according to claim 4 wherein the method steps are performed continuously over a plurality of subsequent injection molding cycles, and wherein the subsequent adjusted instruction time (X') is determined by increasing or decreasing the adjusted instruction time of a prior cycle by an adjustment time equal to the difference in time between the actual open gate time of the prior cycle and the actual open gate time of the present cycle.

16. A method according to claim 6 wherein the cavity sensor continuously detects a selected physical condition at the cavity sensor location (CSL) and transmits a continuous output signal to the controller indicative of the detected physical condition.

17. A method according to claim 6 wherein the position sensor continuously detects a position of the valve pin and transmits a continuous output signal to the controller indicative of the detected position.

18. A method according to claim 6 wherein the position sensor is a switch that only detects the initial opening of the valve pin and transmits the opening signal to the controller.

19. A method according to claim 6 wherein the cavity includes a plurality of upstream and downstream gate pairs having the associated cavity and position sensors, and the method steps are performed for each associated gate pair.

20. A method according to claim 6 wherein the method steps are performed until all valve pins are in the open position and the cavity is filled with the fluid material; and/or
wherein the subsequent injection molding cycle is the immediately following injection molding cycle.

21. A method according to claim 6 further comprising performing a trial injection molding cycle to determine the predetermined open gate target time (X).

22. A method according to claim 6 wherein the controller receives the predetermined open gate target time (X) from a computer input device that receives, from a human operator, the predetermined open gate target time (X); and/or
wherein the predetermined open gate target time (X) is derived from a mold filling simulation; and/or
wherein the controller generates output signals including, for display on a human readable display, the detected arrival time ($t_{DA}$) and the actual open gate time (A).

23. A method according to claim 6 wherein the controller receives the predetermined open gate target time (X) from a computer input device that receives, from a human operator, the predetermined open gate target time (X); and/or
wherein the generating steps are automatically executed by an algorithm executed by the controller; and/or
wherein the controller accesses profile data comprising a desired profile of valve pin position versus time and the controller generates and transmits signals to the actuator for adjusting the position or velocity of the valve pin to approach or match the desired profile.

* * * * *